United States Patent
Zhang et al.

(10) Patent No.: US 12,300,023 B2
(45) Date of Patent: May 13, 2025

(54) TRAINING METHOD OF FACIAL EXPRESSION EMBEDDING MODEL, FACIAL EXPRESSION EMBEDDING METHOD AND FACIAL EXPRESSION EMBEDDING DEVICE

(71) Applicant: NETEASE (HANGZHOU) NETWORK CO., LTD., Zhejiang (CN)

(72) Inventors: Wei Zhang, Zhejiang (CN); Xianpeng Ji, Zhejiang (CN); Yu Ding, Zhejiang (CN); Lincheng Li, Zhejiang (CN); Changjie Fan, Zhejiang (CN); Zhipeng Hu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 444 days.

(21) Appl. No.: 17/743,774

(22) Filed: May 13, 2022

(65) Prior Publication Data
US 2023/0368571 A1 Nov. 16, 2023

(51) Int. Cl.
*G06V 40/16* (2022.01)
*G06V 10/82* (2022.01)

(52) U.S. Cl.
CPC ............ *G06V 40/164* (2022.01); *G06V 10/82* (2022.01); *G06V 40/166* (2022.01)

(58) Field of Classification Search
CPC .... G06V 40/164; G06V 10/82; G06V 40/166; G06V 10/40; G06V 40/174
See application file for complete search history.

(56) References Cited

U.S. PATENT DOCUMENTS 3,221,229 A * 11/1965 Kezer .................. G05D 1/0825
  318/489
11,354,936 B1 * 6/2022 Chandarana ......... G06V 40/172
(Continued)

FOREIGN PATENT DOCUMENTS

JP 2013121097 A * 6/2013

OTHER PUBLICATIONS

F. Güney, N. M. Arar, M. Fischer and H. K. Ekenel, "Cross-pose facial expression recognition," 2013 10th IEEE International Conference and Workshops on Automatic Face and Gesture Recognition (FG), Shanghai, China, 2013, pp. 1-6, doi: 10.1109/FG.2013.6553814. (Year: 2013).*

(Continued)

*Primary Examiner* — Charles T Shedrick
(74) *Attorney, Agent, or Firm* — IP & T GROUP LLP

(57) ABSTRACT

The present disclosure provides a training method of a facial expression embedding model, a facial expression embedding method, and a facial expression embedding device. The method includes: determining a sample set, wherein each sample in the sample set includes three images and a sample label; and training the to-be-trained facial expression embedding model with the sample set, to obtain the trained facial expression embedding model, wherein the to-be-trained facial expression embedding model includes a to-be-trained full face embedding sub-model and a trained identity embedding sub-model, the trained facial expression embedding model includes a trained full face embedding sub-model and the trained identity embedding sub-model, and an output of the trained facial expression embedding model is determined by a difference between an output of the trained full face embedding sub-model and an output of the trained identity embedding sub-model.

20 Claims, 4 Drawing Sheets

(56) References Cited

U.S. PATENT DOCUMENTS

| | | | |
|---|---|---|---|
| 11,386,699 B2* | 7/2022 | Chen | G06V 40/165 |
| 11,790,558 B1* | 10/2023 | Balakrishnan | G06N 20/00 |
| | | | 382/154 |
| 2018/0189553 A1* | 7/2018 | Guo | G06V 40/168 |
| 2019/0005313 A1* | 1/2019 | Vemulapalli | G06V 10/454 |
| 2019/0042833 A1* | 2/2019 | Gernoth | G06V 40/172 |
| 2019/0095698 A1* | 3/2019 | Cole | G06N 20/00 |
| 2019/0102528 A1* | 4/2019 | Beacham | G06V 10/82 |
| 2019/0163959 A1* | 5/2019 | Zhou | G06F 18/25 |
| 2019/0163977 A1* | 5/2019 | Chen | G06F 18/217 |
| 2020/0272717 A1* | 8/2020 | Figueredo de Santana | |
| | | | G06V 40/172 |
| 2020/0302154 A1* | 9/2020 | Chen | G06V 40/172 |
| 2021/0097468 A1* | 4/2021 | Socolof | G06Q 10/06393 |
| 2021/0150186 A1* | 5/2021 | Lehman | G06V 40/171 |
| 2024/0005905 A1* | 1/2024 | Chen | G10L 25/63 |
| 2024/0029345 A1* | 1/2024 | Selvert | G06T 19/20 |

OTHER PUBLICATIONS

R. Vemulapalli and A. Agarwala, "A Compact Embedding for Facial Expression Similarity," 2019 IEEE/CVF Conference on Computer Vision and Pattern Recognition (CVPR), Long Beach, CA, USA, 2019, pp. 5676-5685, doi: 10.1109/CVPR.2019.00583. (Year: 2019).*

* cited by examiner

TRAINING METHOD OF FACIAL EXPRESSION EMBEDDING MODEL, FACIAL EXPRESSION EMBEDDING METHOD AND FACIAL EXPRESSION EMBEDDING DEVICE

TECHNICAL FIELD

The present disclosure relates to the technical field of image processing, and in particular to a training method of a facial expression embedding model, a facial expression embedding method, and a facial expression embedding device.

BACKGROUND ART

Human beings have the natural instinct to perceive expressions, but such natural instinct is not possessed by machines. An accurate expression embedding model can promote the understanding of machines to human emotions, which provides an important technological basis for establishing a friendly, intelligent, and harmonious human-machine interaction system, and can help promote the development of a plurality of relevant downstream tasks, including expression image retrieval, emotion recognition, facial action unit (AU) recognition, facial expression generation, etc.

SUMMARY

Currently, methods of representing facial expressions include AU-based methods, similarity-based methods and so on. However, these current embedding methods for a facial expression have relatively low accuracy.

An objective of the present disclosure lies in providing a training method of a facial expression embedding model, a facial expression embedding method, and a facial expression embedding device, so as to alleviate the technical problem that the current embedding methods for a facial expression have relatively low accuracy.

In a first aspect, an embodiment of the present disclosure provides a training method of a facial expression embedding model, wherein the method includes:

determining a sample set, wherein each sample in the sample set includes three images and a sample label; and training a to-be-trained facial expression embedding model with the sample set, to obtain a trained facial expression embedding model, wherein the to-be-trained facial expression embedding model includes a to-be-trained full face embedding sub-model and a trained identity embedding sub-model, wherein the trained facial expression embedding model includes a trained full face embedding sub-model and the trained identity embedding sub-model, and an output of the trained facial expression embedding model is determined by a difference between an output of the trained full face embedding sub-model and an output of the trained identity embedding sub-model.

In a second aspect, an embodiment of the present disclosure provides a facial expression embedding method, wherein the method includes steps of:

acquiring a to-be-represented facial image;

processing the facial image with the trained full face embedding model, to obtain a full face feature vector;

processing the facial image with a pretrained identity embedding model, to obtain an identity feature vector; and subtracting the full face feature vector with the identity feature vector, to obtain an expression feature vector, and obtaining an expression embedding result based on the expression feature vector.

In a third aspect, an embodiment of the present disclosure further provides a computer device, comprising a memory and a processor, the memory storing a computer program that can run on the processor, wherein when the processor executes the computer program, steps of a method for training a facial expression embedding model are implemented, wherein the method comprises:

determining a sample set, wherein each sample in the sample set comprises a sample image and a sample tag; and training a to-be-trained facial expression embedding model by using the sample set, to obtain a trained facial expression embedding model, wherein the to-be-trained facial expression embedding model comprises a to-be-trained full face embedding sub-model and a trained identity embedding sub-model, and the trained facial expression embedding model comprises a trained full face embedding sub-model and the trained identity embedding sub-model, and an output of the trained facial expression embedding model is determined by a difference between an output of the trained full face embedding sub-model and an output of the trained identity embedding sub-model.

In a fourth aspect, an embodiment of the present disclosure further provides a computer readable storage medium, wherein a computer executable instruction is stored in the computer readable storage medium, and when the computer executable instruction is invoked and run by a processor, the computer executable instruction causes the processor to run a method for training a facial expression embedding model, wherein the method comprises:

determining a sample set, wherein each sample in the sample set comprises a sample image and a sample tag; and training a to-be-trained facial expression embedding model by using the sample set, to obtain a trained facial expression embedding model, wherein the to-be-trained facial expression embedding model comprises a to-be-trained full face embedding sub-model and a trained identity embedding sub-model, and the trained facial expression embedding model comprises a trained full face embedding sub-model and the trained identity embedding sub-model, and an output of the trained facial expression embedding model is determined by a difference between an output of the trained full face embedding sub-model and an output of the trained identity embedding sub-model.

The embodiments of the present disclosure bring the following beneficial effects.

For the training method of a facial expression embedding model, the facial expression embedding method, and the facial expression embedding device provided in the embodiments of the present disclosure, first, the sample set is determined, wherein each sample includes three images and a sample label, then the to-be-trained facial expression embedding model is trained with the sample set, to obtain the trained facial expression embedding model, wherein the to-be-trained facial expression embedding model includes the to-be-trained full face embedding sub-model and the trained identity embedding sub-model, the trained facial expression embedding model includes the trained full face embedding sub-model and the trained identity embedding sub-model, and the output of the trained facial expression embedding model is determined by the difference between the output of the trained full face embedding sub-model and the output of the trained identity embedding sub-model. In the present solution, with the difference between the output of the trained full face embedding sub-model and the output of the trained identity embedding sub-model, the identity information can be removed from the overall trained facial expression embedding model, that is, only information related to expression features is retained, realizing decoupling between the identity feature and the expression feature, and eliminating the influence of personal identity information on the facial expression, therefore, the accuracy can be improved by detecting the facial expression embedding using such trained facial expression embedding model, and the technical problem that the current embedding methods for a facial expression have relatively low accuracy is solved.

In order to make the above objectives, features, and advantages of the present disclosure more apparent and understandable, preferred embodiments are particularly illustrated below in combination with attached drawings to make following detailed description.

BRIEF DESCRIPTION OF DRAWINGS

In order to more clearly illustrate technical solutions in specific embodiments of the present disclosure or the prior art, drawings which need to be used in the description of the specific embodiments or the prior art will be introduced briefly below. Apparently, the drawings in the description below merely show some embodiments of the present disclosure, and those ordinarily skilled in the art still could obtain other drawings in light of these drawings, without using creative efforts.

DETAILED DESCRIPTION OF EMBODIMENTS

Figure 1:
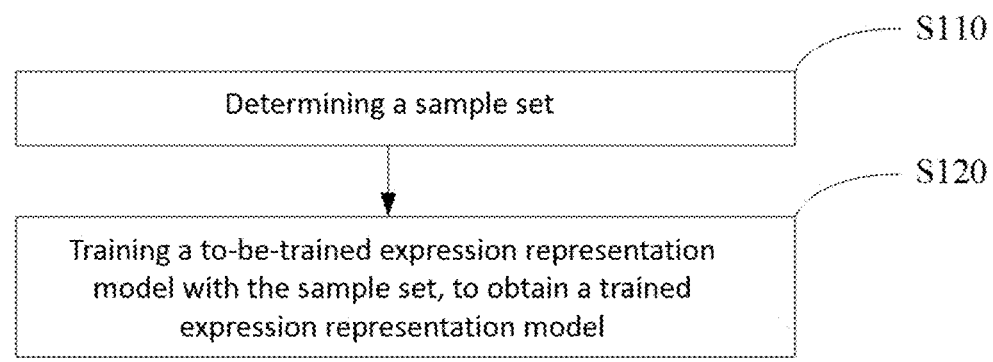
FIG. 1 is a schematic flowchart of a training method of a facial expression embedding model provided in an embodiment of the present disclosure.

In order to make objectives, technical solutions, and advantages of the embodiments of the present disclosure clearer, the technical solutions of the present disclosure will be described clearly and completely below in conjunction with drawings, and apparently, the embodiments described are some but not all embodiments of the present disclosure. All of other embodiments obtained by those ordinarily skilled in the art based on the embodiments in the present disclosure without using creative efforts shall fall within the scope of protection of the present disclosure.

Terms "comprise", "have" and any derivatives thereof mentioned in the embodiments of the present disclosure are intended to cover non-exclusive inclusion. For example, a process, method, system, product or device that contains a series of steps or units is not limited to those listed steps or units, but optionally includes other steps or units not listed or optionally further includes other steps or units inherent to such process, method, product or device.

Human beings have the natural instinct to perceive expressions, but such natural instinct is not possessed by machines, because the machines can hardly simulate the abstract perception process of human beings through well-defined features. Therefore, how to reasonably represent expressions and promote natural and harmonious development of human-computer interaction functions, and provide technical support for multiple application fields, is a relatively popular research direction.

Some methods use the basic emotion types (Happiness, Neutral, Anger, Fear, Sadness, Surprise, Disgust) to represent facial expressions. some early work of such methods often uses manual features such as local binary pattern (LBP) features and scale-invariant feature transform (SIFT) to represent expression features. With the development of deep learning, the emotion classification task is often completed with a structure of convolutional neural network (CNN), and features of the network of the last layer or the penultimate layer are acquired as embedding of expression. However, in these methods, huge differences between a large number of expressions contained in a certain kind of emotion are easily ignored, resulting in that the acquired expression embedding does not have sufficiently fine granularity, is relatively discretely distributed, and can hardly accurately represent some complex and subtle expressions.

Alternatively, the expression embedding can be detected based on similarity comparison, which often can realize embedding of finer granularity. However, this method needs a large number of data for comparison, and requires high annotation requirement for the data.

In addition, the facial expression data further can be represented by fixed and discrete AUs, namely, the face is divided into a plurality of AUs according to muscle movement and anatomical characteristics of human face. Each AU reflects the muscle movement of a local position of the face, and different expressions can be represented by linear combinations of different AUs, for example, the expression with happy expression can be generally represented by a combination of AU6 and AU12. However, AUs cannot define all facial expression data with clear semantic meaning, thus the degree of freedom displayed by the embedding mode is not rich enough. Moreover, the detection of the AUs has relatively low accuracy due to the close coupling of the AUs with the identity information of individuals.

Based on this, an embodiment of the present disclosure provides a training method of a facial expression embedding model, a facial expression embedding method, and a facial expression embedding device. With this method, the technical problem that the current embedding methods for a facial expression have relatively low accuracy can be solved.

The embodiments of the present disclosure are further introduced below in conjunction with drawings.

FIG. 1 is a schematic flowchart of a training method of a facial expression embedding model provided in an embodiment of the present disclosure. As shown in FIG. 1, the method includes:

Step S110, determining a sample set.

In the above, each sample in the sample set includes three sample images and a sample label. It should be noted that each sample contains three facial images, and the sample label is used to indicate which one has the most different expression in the three images.

Step S120, training a to-be-trained facial expression embedding model with the sample set, to obtain a trained facial expression embedding model.

In the above, the to-be-trained facial expression embedding model includes a to-be-trained full face embedding sub-model and a trained identity embedding sub-model, wherein the trained facial expression embedding model includes a trained full face embedding sub-model and the trained identity embedding sub-model, and an output of the trained facial expression embedding model is determined by a difference between an output of the trained full face embedding sub-model and an output of the trained identity embedding sub-model.

Figure 2:
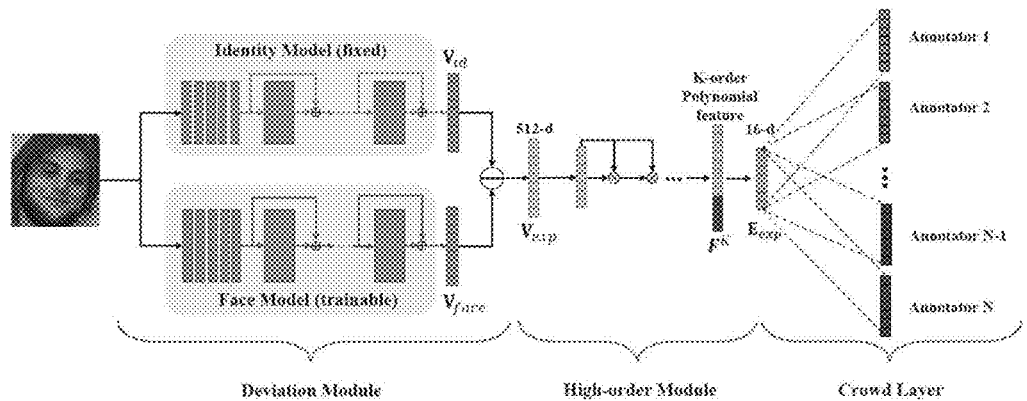
FIG. 2 is a model diagram of a training method of a facial expression embedding model provided in an embodiment of the present disclosure.

For example, as shown in FIG. 2, the to-be-trained facial expression embedding model includes the to-be-trained full face embedding sub-model (Face Model) and the trained identity embedding sub-model (Identity Model), the output of the trained facial expression embedding model is determined by the difference (512-dimensional difference feature $V_{exp}$ output by Deviation Module layer) between the output ($V_{face}$) of the trained full face embedding sub-model and the output ($V_{id}$) of the trained identity embedding sub-model, that is, the deviation from its identity feature is taken as a real facial expression feature of the input image.

In an embodiment of the present disclosure, with the difference between the output of the trained full face embedding sub-model and the output of the trained identity embedding sub-model, the identity information can be removed from the overall trained facial expression embedding model, that is, only information related to expression features is retained, realizing decoupling between the identity feature and the expression feature, and eliminating the influence of personal identity information on the facial expression, therefore, the accuracy can be improved by detecting the facial expression embedding with such trained facial expression embedding model. Moreover, by decoupling the expression feature and the identity feature, the obtained facial expression feature is not affected by personalized looks, thus enhancing the robust performance, and improving the precision of facial expression embedding.

The above steps are introduced in detail below.

In some embodiments, the to-be-trained full face embedding sub-model may have the same network structure as the trained identity embedding sub-model. As an example, the trained identity embedding sub-model and the to-be-trained full face embedding sub-model have the same network structure.

For example, as shown in FIG. 2, the to-be-trained full face embedding sub-model (Face Model) and the trained identity embedding sub-model (Identity Model) have the same network structure, and dimensions of all output feature vectors thereof are 512, respectively, wherein parameters of the trained identity embedding sub-model (Identity Model) are fixed, while parameters of the to-be-trained full face embedding sub-model (Face Model) are trainable.

By setting the trained identity embedding sub-model and the to-be-trained full face embedding sub-model to be the same model, the output of the trained full face embedding sub-model contains information about identity and expression, while the output of the trained identity embedding sub-model only contains identity information, so that the difference between the trained full face embedding sub-model and the trained identity embedding sub-model is more simple expression information, improving the training efficiency of the facial expression embedding model.

In some embodiments, dimensionality reduction processing can be performed on the difference with a dimensionality reduction layer. As an example, the trained facial expression embedding model further contains the dimensionality reduction layer; and the dimensionality reduction layer is configured to perform the dimensionality reduction processing on the difference, to obtain an expression embedding result output by the trained facial expression embedding model.

For example, as shown in FIG. 2, the difference feature $V_{exp}$ can be mapped from a high-dimensional space of 512 dimensions to a low-dimensional model of 16 dimensions with the dimensionality reduction layer (High-order module), and meanwhile an expression embedding result $E_{exp}$ output by the trained facial expression embedding model can be obtained through K-order Polynomial feature.

The dimensionality reduction processing can be performed on the high-dimensional difference with the dimensionality reduction layer, so that a more compact encoding space is realized, and thus the robustness of the model is further improved.

In some embodiments, the dimensionality reduction layer can normalize the difference after the dimensionality reduction processing. As an example, a fully-connected neural network in the dimensionality reduction layer is configured to perform the dimensionality reduction processing on the difference, and normalize the difference after the dimensionality reduction processing by 12-norm, to obtain the expression embedding result.

For example, the fully-connected neural network in the dimensionality reduction layer can help to fit mapping of a non-linear vector, and meanwhile the difference after the dimensionality reduction processing can be normalized with the L2-norm, to finally obtain a 16-dimensional feature vector, i.e., expression embedding result $E_{exp}$. By normalizing the difference after the dimensionality reduction processing, the training process can be more stable and the expression embedding can be more compact.

In some embodiments, the sample images in the sample set can be annotated in a plurality of manners. As an example, the sample set includes a plurality of first sample sets, and each first sample set contains a first anchor sample, a first positive sample, and a first negative sample; and the sample set further includes second sample sets, and each second sample set contains a first anchor sample and a second positive sample, wherein the second positive sample is a positive sample closest to the first anchor sample in expression among the plurality of first positive samples in the plurality of sets.

Figure 3:
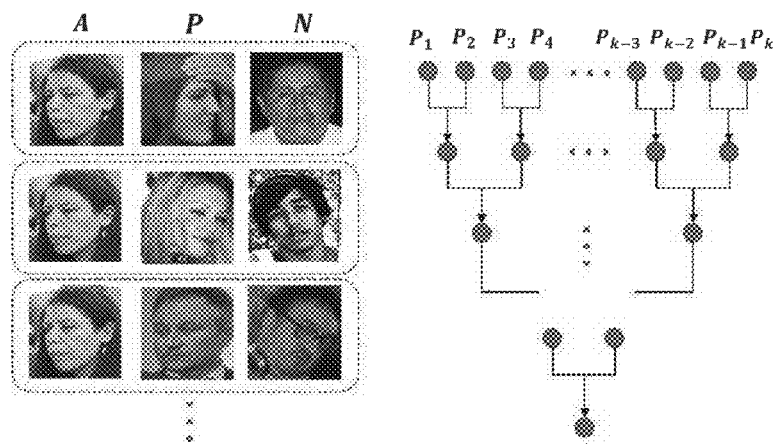
FIG. 3 is a diagram of data samples of a training method of a facial expression embedding model provided in an embodiment of the present disclosure.

For example, as shown in FIG. 3, each first sample set contains the first anchor sample, the first positive sample, and the first negative sample, that is, three sample images can be randomly selected from the first sample set as a piece of triplet data, and one of the sample images that is mostly dissimilar to the other two sample images in expression is taken as the first negative sample (Negative, denoted as N), and two other sample images are respectively taken as the first anchor sample (Anchor, denoted as A) and the first positive sample (Positive, denoted as P).

Moreover, on the basis of the current triplet solution, for each anchor sample, from the positive samples in all triplets corresponding to the anchor sample, a positive sample which is the most similar to the anchor sample in expression is picked out by comparison, and then the negative samples in those triplets lost in comparison with the positive samples are added, to be combined together as some additionally obtained triplet data. These additional triplet data and the plurality of sets of the original triplet samples are integrated together to form a data set D composed of a large number of triplets, so that supervision information is as close to a critical point as possible.

In an embodiment of the present disclosure, the adopted training sample data comes from FECNet public data set, and this data set contains 449329 pieces of effective triplet data. In addition, each sample set contains the first anchor sample that repeatedly appears in different triplets, which can continuously enhance refinement of data, and improve the accuracy of the trained model.

In some embodiments, the positive sample closest to the first anchor sample can be obtained by continuously comparing adjacent first positive samples. As an example, the second positive sample is a positive sample closest to the first anchor sample, which is obtained by comparing two adjacent first positive samples in sequence among a plurality of first positive samples corresponding to the same first anchor sample.

Figure 4:
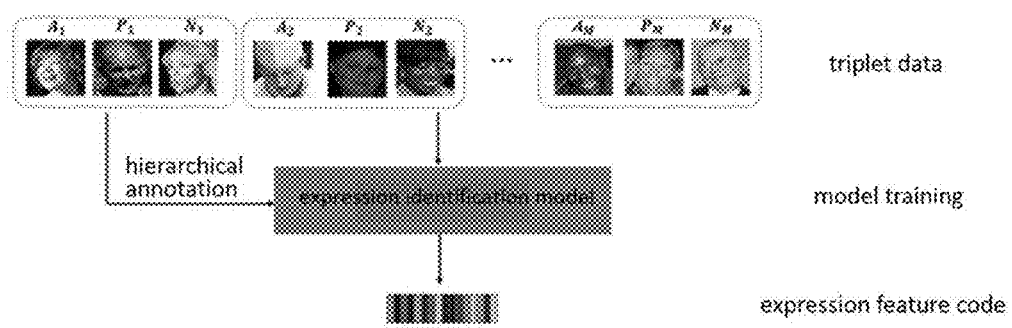
FIG. 4 is an overall logical diagram of a training method of a facial expression embedding model provided in an embodiment of the present disclosure.

For example, as shown in FIG. 3 and FIG. 4, based on the above annotation, a comparison mode of tree structure may be established for the same first anchor sample. First, a set of triplets with the same first anchor sample is referred to as a group, then in one group, the first positive samples in any two different triplets are compared, to select one positive sample closer to the first anchor sample to enter the next layer for comparison, and then two adjacent positive samples are still combined in the next layer to complete the same comparison, until the positive sample closest to the first anchor sample is picked out. It can be obtained from the above comparison that $P_1$ is closer to A than $P_2$, and meanwhile as $P_2$ is known to be closer to A than $N_2$, a new triplet $(A, P_1, N_2)$ can be obtained, and the triplet can be obtained without comparison.

Through the comparison mode of tree structure, more critical samples with higher fine granularity can be advantageously supplemented, thus improving the effectiveness of supervision.

In some embodiments, as for the subjective difference of different annotators, the facial expression embedding model can be further optimized with the annotation prediction data of different annotators. As an example, the fully-connected layer is further provided after the dimensionality reduction layer, wherein the fully-connected layer is configured to perform annotation prediction based on the expression embedding result, to obtain annotation prediction results respectively corresponding to a plurality of annotators; and the annotation prediction results are used to alleviate the noise caused by the subjective difference and correct some error annotation implicitly.

For example, as shown in FIG. 2, a fully-connected layer (Crowd Layer) may be constructed for each annotator, and N annotation prediction results (Annotator N) respectively corresponding to a plurality of annotators can be obtained, wherein the input of each fully-connected layer comes from a common expression embedding result $E_{exp}$, and the output is the expression embedding result respectively corresponding to each annotator, and meanwhile, during testing and prediction, it is feasible that only the expression embedding result $E_{exp}$ before the fully-connected layer is used as an expression feature code.

With the fully-connected layer, annotation prediction can be performed on the final expression embedding results respectively corresponding to a plurality of annotators, so as to obtain the annotation prediction results respectively corresponding to the plurality of annotators, then subjective differences between different annotators can be avoided, and thus the accuracy of the trained model can be improved.

In some embodiments, in the process of predicting the annotations of the annotators, the annotation results respectively corresponding to each annotator can be predicted on the basis of the comparison result of Euclidean distances. As an example, each annotator has the individual fully-connected layer to output the individual expression embedding from a common expression embedding. By comparing Euclidean distances of three expression embedding of each data sample images, each fully-connected layer predict the individual label of each annotator.

It should be noted that the annotation prediction results respectively corresponding to each annotator can be obtained based on the comparison result of the Euclidean distances by comparing each two Euclidean distances between a plurality of expression features corresponding to a plurality of sample labels annotated by each annotator for the same sample image.

With the solution making independent prediction, comparison and correction by using a plurality of annotators, a plurality of pieces of annotation data and sample labels can be effectively used, thus saving the labor costs.

In some embodiments, in the process of further optimizing the facial expression embedding model, the trained facial expression embedding model can be further corrected and optimized with a loss function corresponding to the predicted annotation result through a gradient descent method. As an example, the predicted annotation result is used to correct the trained facial expression embedding model through the gradient descent method using the loss function corresponding to the predicted annotation result and continuously iterate, until a predicted deviation gradually converges, and thus a corrected facial expression embedding model can be obtained, wherein the loss function is used to represent a disparity between the predicted annotation result and an actual annotation result of the annotator.

For example, as shown in FIG. 4, during training, the annotator of each piece of data will output respective predicted annotation result, then the loss function can be calculated with a plurality of predicted annotation results, and further the trained facial expression embedding model is corrected through the gradient descent method and is iterated continuously, until the predicted deviation gradually converges, and finally the corrected facial expression embedding model can be obtained.

Exemplarily, in the present embodiment, a loss function Triplet Loss is adopted as a training basis of a model, and an SGD optimizer is used to realize gradient calculation and parameter updating. First, a piece of triplet data $[I_{a_k}, I_{p_k}, I_{n_k}]$ is sent to a network, where $a_k$, $p_k$, and $n_k$ represent Anchor, Positive, and Negative samples annotated by kth annotators, and then expression embedding codes $\{E_{a_k}, E_{p_k}, E_{n_k}\}$ corresponding to the corresponding annotators can be obtained respectively through the facial expression embedding model, where $\{E_{a_k}, E_{p_k}, E_{n_k}\}$ satisfies the relationship that the distance between $E_{a_k}$ and $E_{p_k}$ is closer and both of them are far away from $E_{n_k}$.

The calculation formula of the loss function Triplet Loss is as follows, where m represents an interval:

$$Loss_k = \max(0, \|E_{a_k} - E_{p_k}\|_2^2 - \|E_{a_k} - E_{n_k}\|_2^2 + m) + \max(0, \|E_{a_k} - E_{p_k}\|_2^2 - \|E_{p_k} - E_{n_k}\|_2^2 + m)$$

The trained facial expression embedding model is corrected through the gradient descent method and iterated continuously, until the predicted deviation gradually converges, to obtain the corrected facial expression embedding model. A more compact encoding space can be obtained through dimensionality reduction.

Figure 5:
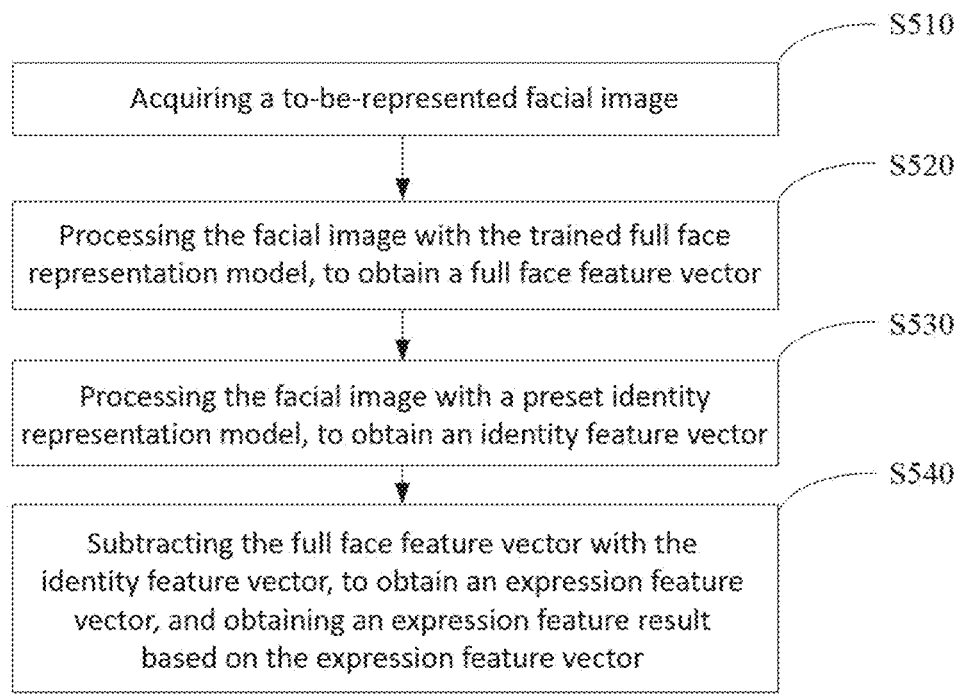
FIG. 5 is a schematic flowchart of a facial expression embedding method provided in an embodiment of the present disclosure.

FIG. 5 is a schematic flowchart of a facial expression embedding method provided in an embodiment of the present disclosure. As shown in FIG. 5, the method includes following steps.

Step S510, acquiring a to-be-represented facial image.

It should be noted that, in the present step, a to-be-represented facial image may be acquired and input into an embedding model.

Step S520, processing the facial image with the trained full face embedding model, to obtain a full face feature vector.

Exemplarily, a 512-dimensional full face feature vector can be obtained by processing the facial image with the trained full face embedding model.

Step S530, processing the facial image with a preset identity embedding model, to obtain an identity feature vector.

Exemplarily, a 512-dimensional identity feature vector can be obtained by processing the facial image with trained preset identity embedding model.

Step S540, subtracting the full face feature vector with the identity feature vector, to obtain an expression feature vector, and obtaining an expression embedding result based on the expression feature vector.

In the present embodiment, by subtracting the full face feature vector with the identity feature vector, the expression feature vector without the identity information can be obtained, that is, only the information related to the expression feature is retained, and the influence of the personal identity information on the facial expression is removed, such that the decoupling between the identity feature and the expression feature is realized, and the accuracy of facial expression embedding is improved.

The above steps are introduced in detail below.

In some embodiments, the dimensionality reduction processing can be performed on the expression feature vector. As an example, the above step S540 may include the following steps:

Step a), performing dimensionality reduction processing on the expression feature vector, to obtain an expression embedding result.

It should be noted that, the expression feature vector may be mapped from 512 dimensions to 16 dimensions with the dimensionality reduction layer, and meanwhile the expression embedding result can be obtained. By performing the dimensionality reduction processing on the expression feature vector, the expression embedding space can be more compact.

The facial expression embedding method provided by the embodiment of the present disclosure has the same technical features as the training method of a facial expression embedding model provided by the above embodiment, and thus can also solve the same technical problem, and achieve the same technical effect.

Figure 6:
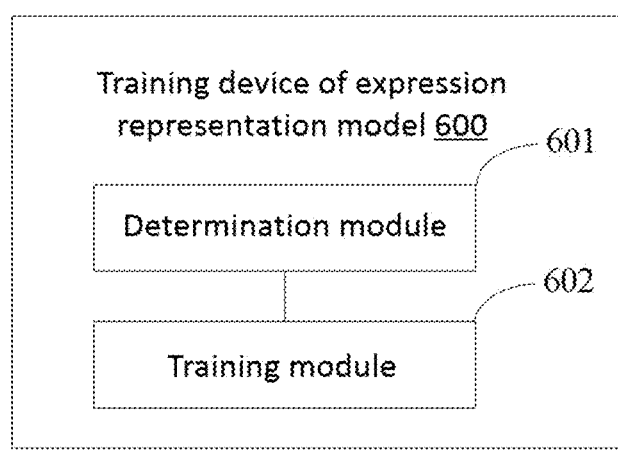
FIG. 6 is a structural schematic view of a training device of a facial expression embedding model provided in an embodiment of the present disclosure.

FIG. 6 provides a structural schematic view of a training device of a facial expression embedding model. As shown in FIG. 6, the training device 600 of a facial expression embedding model includes:

a determination module 601, configured to determine a sample set, wherein each sample in the sample set includes three sample images and a sample label; and a training module 602, configured to train a to-be-trained facial expression embedding model with the sample set, to obtain a trained facial expression embedding model, wherein the to-be-trained facial expression embedding model includes a to-be-trained full face embedding sub-model and a trained identity embedding sub-model, the trained facial expression embedding model includes a trained full face embedding sub-model and the trained identity embedding sub-model, and an output of the trained facial expression embedding model is determined by a difference between an output of the trained full face embedding sub-model and an output of the trained identity embedding sub-model.

In some embodiments, the trained identity embedding sub-model and the to-be-trained full face embedding sub-model have the same network structure . . . .

In some embodiments, the trained facial expression embedding model further contains a dimensionality reduction layer; and the dimensionality reduction layer is configured to perform dimensionality reduction processing on the difference, to obtain an expression embedding result output by the trained facial expression embedding model.

In some embodiments, a fully-connected neural network in the dimensionality reduction layer is configured to perform the dimensionality reduction processing on the difference, and normalize the difference after the dimensionality reduction processing with L2-norm, to obtain the expression embedding result.

In some embodiments, the sample set includes a plurality of first sample sets, and each first sample set contains a first anchor sample, a first positive sample, and a first negative sample; and the sample set further includes: a second sample set, and each second sample set contains a first anchor sample and a second positive sample, wherein the second positive sample is a positive sample closest to the first anchor sample in expression among the plurality of first positive samples in the plurality of sets.

In some embodiments, the second positive sample is a positive sample closest to the first anchor sample in expression obtained by comparing two adjacent first positive samples in sequence among a plurality of first positive samples corresponding to the same first anchor sample.

In some embodiments, the fully-connected layer is further provided after the dimensionality reduction layer;

the fully-connected layer is configured to perform annotation prediction based on the expression embedding result, to obtain annotation prediction results respectively corresponding to a plurality of annotators; and the annotation prediction results are used as correction samples to correct the trained facial expression embedding model.

In some embodiments, each annotator has the individual fully-connected layer to output the individual expression embedding from a common expression embedding. By comparing Euclidean distances of three expression embedding of each data sample images, each fully-connected layer predict the individual label of each annotator.

In some embodiments, the predicted annotation result is configured to correct the trained facial expression embedding model through the gradient descent method by using the loss function corresponding to the predicted annotation result and continuously iterate, until a predicted deviation gradually converges, such that a corrected facial expression embedding model is obtained, wherein the loss function is used to represent a disparity between the predicted annotation result and an actual annotation result of the annotator.

The training device of a facial expression embedding model provided in the embodiment of the present disclosure has the same technical features as the training method of a facial expression embedding model and the facial expression embedding method provided by the above embodiments, and thus can also solve the same technical problem, and achieve the same technical effect.

Figure 7:
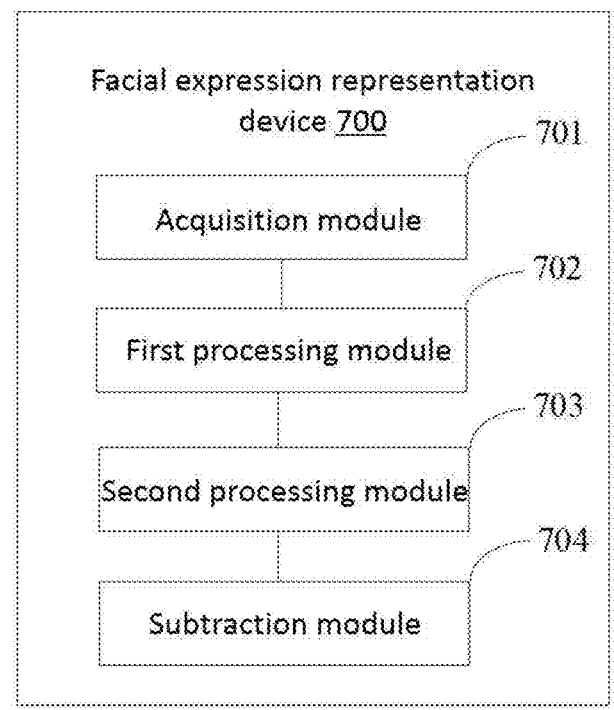
FIG. 7 is a structural schematic view of a facial expression embedding device provided in an embodiment of the present disclosure.

FIG. 7 provides a structural schematic view of a facial expression embedding device. As shown in FIG. 7, the facial expression embedding device 700 includes:
  an acquisition module 701, configured to acquire a to-be-represented facial image;
  a first processing module 702, configured to process the facial image with the trained full face embedding model, to obtain a full face feature vector;
  a second processing module 703, configured to process the facial image with a preset identity embedding model, to obtain an identity feature vector; and
  a subtraction module 704, configured to subtract the full face feature vector with the identity feature vector, to obtain an expression feature vector, and obtain an expression embedding result based on the expression feature vector.

In some embodiments, the subtraction module 704 is specifically configured to:
  perform dimensionality reduction processing on the expression feature vector, to obtain an expression embedding result.

The facial expression embedding device provided in the embodiment of the present disclosure has the same technical features as the facial expression embedding method, the training method of a facial expression embedding model and the training device of a facial expression embedding model provided by the above embodiments, and thus can also solve the same technical problem, and achieve the same technical effect.

Figure 8:
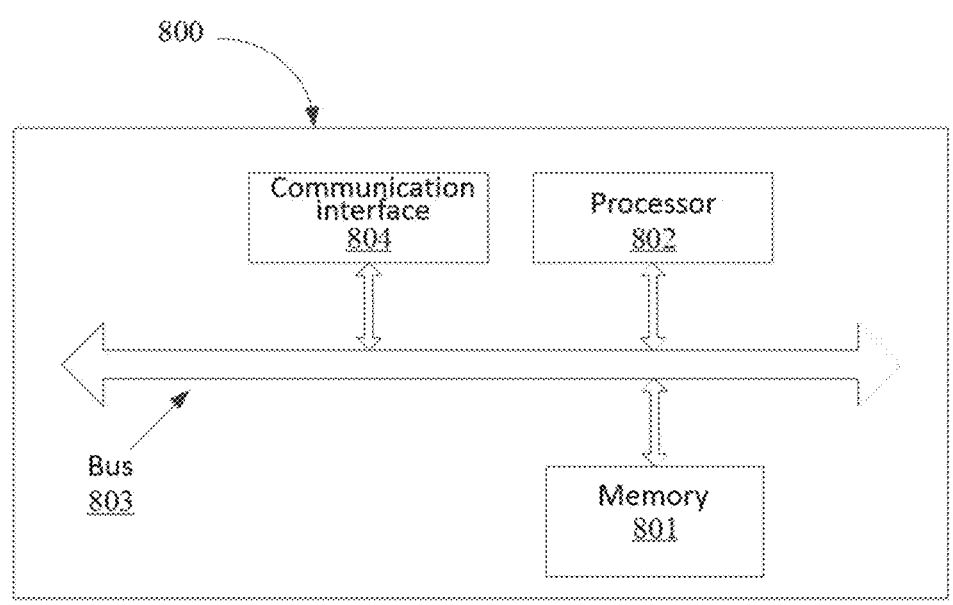
FIG. 8 is a structural schematic view of a computer device provided in an embodiment of the present disclosure.

An embodiment of the present disclosure further provides a computer device. As shown in FIG. 8, the computer device 800 includes a processor 802 and a memory 801. The memory stores a computer program that can run on the processor. When the processor executes the computer program, the steps of the method provided by the above embodiments are implemented.

Referring to FIG. 8, the computer device further includes: a bus 803 and a communication interface 804, and the processor 802, the communication interface 804, and the memory 801 are connected via the bus 803; and the processor 802 is configured to execute an executable module, e.g., a computer program, stored in the memory 801.

In the above, the memory 801 may include a high-speed random access memory (RAM for short), and also may include a non-volatile memory, for example, at least one disk memory. Communication connection between this system network element and at least one other network element is achieved through at least one communication interface 804 (possibly wired or wireless), and internet, wide area network, local network, metropolitan area network and so on may be used.

The bus 803 may be an ISA bus, a PCI bus, or an EISA bus. The bus may be an address bus, a data bus, a control bus and so on. For ease of embedding, the bus is represented merely with one two-way arrow in FIG. 8, but it does not mean that there is only one bus or one type of bus.

In the above, the memory 801 is configured to store programs, the processor 802 executes the programs upon receipt of an execution instruction. The method executed by the device defined by the process disclosed in any embodiment of the present disclosure in the preceding can be applied to the processor 802, or realized by the processor 802.

The processor 802 may be an integrated circuit chip, with a signal processing function. In an implementation process, various steps of the above method may be completed by an integrated logic circuit of hardware in the processor 802 or instruction in a software form. The above processor 802 may be a general-purpose processor, including central processing unit (CPU for short), network processor (NP for short), etc., and also may be a digital signal processor (DSP for short), an application specific integrated circuit (ASIC for short), a field-programmable gate array (FPGA for short) or other programmable logic devices, discrete gates, transistor logic devices, or discrete hardware components that can realize or implement various methods, steps, and logic blocks disclosed in the embodiments of the present disclosure. The general-purpose processor may be a microprocessor or the processor also may be any conventional processor and so on. The steps in the method disclosed in the embodiments of the present disclosure may be directly carried out and completed by hardware decoding processor, or carried out and completed by a combination of hardware and software modules in the decoding processor. The software module may be located in a mature storage medium in the art such as a random access memory, a flash memory, a read-only memory, a programmable read-only memory or an electrically erasable programmable memory, and register. The storage medium is located in the memory 801, and the processor 802 reads information in the memory 801, and is combined with hardware thereof to complete the steps of the above method.

An embodiment of the present disclosure further provides a computer readable storage medium, wherein a machine executable instruction is stored in the computer readable storage medium, and when the computer executable instruction is invoked and run by a processor, the computer executable instruction causes the processor to run the steps of the above training method of a facial expression embedding model and the above facial expression embedding method.

The training device of a facial expression embedding model and the facial expression embedding device provided in the embodiments of the present disclosure may be specific hardware on an equipment or software, firmware or the like installed on equipment. The devices provided in the embodiments of the present disclosure have the same implementation principle and produce the same technical effects as those in the preceding method embodiments, and for the sake of concise description, reference can be made to corresponding contents in the preceding method embodiments for contents which are not mentioned in the part of the device embodiments. A person skilled in the art can clearly know that for the sake of convenience and conciseness of description, reference can be made to corresponding processes in the above method embodiments for specific operation processes of the system, device, and unit described in the preceding, and they will not be repeated redundantly herein.

In the embodiments provided in the present disclosure, it should be understood that the devices and the methods disclosed may be implemented in other manners. The device embodiments described in the above are merely exemplary, for example, the units are merely divided according to logical functions, but they may be divided in other manners in practical implementation, for another example, multiple units or components may be combined or may be integrated into another system, or some features may be omitted, or not executed. In addition, mutual couplings or direct coupling or communication connection as shown or discussed may be indirect coupling or communication connection via some communication interfaces, means or units, and may be in an electrical form, a mechanical form or other forms.

For another example, the flowcharts and the block diagrams in the drawings illustrate possible system architectures, functions, and operations of the device, method, and computer program products according to multiple embodiments of the present disclosure. In this regard, each block in the flowchart or the block diagram may represent one module, program segment, or a part of code, and the module, the program segment, or the part of the code contains one or more executable instructions configured to achieve a specified logical function. It also should be noted that in some embodiments as substitution, the functions indicated in the blocks also may take place in an order different from that indicated in the drawings. For example, two continuous blocks practically can be executed substantially in parallel, and they sometimes also may be executed in a reverse order, which depends upon a function involved. It also should be noted that each block in the block diagrams and/or flowcharts, and combinations of the blocks in the block diagrams and/or the flowcharts can be realized by a dedicated hardware-based system configured to execute a specified function or action, or can be realized by a combination of dedicated hardware and computer instructions.

The units described as separate parts may be or also may not be physically separated, the parts displayed as units may be or also may not be physical units, i.e., they may be located at one place, or also may be distributed on a plurality of network units. The objective of the solution of the present embodiment may be realized by selecting part or all of the units thereof as actually required.

Besides, various functional units in the embodiments provided in the present disclosure may be integrated into one processing unit, or each unit also may exist in a physically independent way, and two or more than two units also may be integrated into one unit.

If the function is realized in a form of software functional unit and is sold or used as an individual product, it may be stored in one computer readable storage medium. Based on such understanding, the technical solutions in essence or parts making contribution to the prior art or parts of the technical solutions of the present application can be embodied in form of a software product, and this computer software product is stored in a storage medium, including several instructions for making one computer device (which can be a personal computer, a server or a network device, etc.) execute all or part of the steps of the training method of a facial expression embedding model and the facial expression embedding method of various embodiments of the present disclosure. The aforementioned storage medium includes various media in which program codes can be stored, such as U disk, mobile hard disk, read-only memory (ROM), random access memory (RAM), diskette and compact disk.

It should be noted that similar reference signs and letters represent similar items in the following drawings, therefore, once a certain item is defined in one drawing, it is not needed to be further defined or explained in subsequent drawings. Besides, terms such as "first", "second", and "third" are merely for distinctive description, but should not be construed as indicating or implying importance in the relativity.

Finally, it should be indicated that the embodiments above are merely specific embodiments of the present disclosure, for illustrating the technical solutions of the present disclosure, rather than limiting the present disclosure. The scope of protection of the present disclosure should not be limited thereto. While the detailed description is made to the present disclosure with reference to the above-mentioned embodiments, those ordinarily skilled in the art should understand that the technical solutions recited in the above-mentioned embodiments still can be modified, or readily changed, or equivalent substitutions can be made to some of the technical features therein within the technical scope disclosed in the present disclosure; and these modifications, changes, or substitutions do not make the corresponding technical solutions essentially depart from the scope of the technical solutions of the embodiments of the present disclosure. They all should be covered within the scope of protection of the present disclosure. Therefore, the scope of protection of the present disclosure should be determined by the scope of protection of the claims.

What is claimed is:

1. A method for training a facial expression embedding model, wherein the method comprises:
   determining a sample set, wherein each sample in the sample set comprises three images and a sample label; and
   training a to-be-trained facial expression embedding model by using the sample set, to obtain a trained facial expression embedding model, wherein the to-be-trained facial expression embedding model comprises a to-be-trained full face embedding sub-model and a trained identity embedding sub-model, and the trained facial expression embedding model comprises a trained full face embedding sub-model and the trained identity embedding sub-model, and an output of the trained facial expression embedding model is determined by a difference between an output of the trained full face embedding sub-model and an output of the trained identity embedding sub-model.

2. The method according to claim 1, wherein the trained identity embedding sub-model and the to-be-trained full face embedding sub-model have the same network structure.

3. The method according to claim 1, wherein the trained facial expression embedding model further contains a dimensionality reduction layer,
   wherein the dimensionality reduction layer is configured to perform dimensionality reduction processing on the difference, to obtain an expression embedding result output by the trained facial expression embedding model.

4. The method according to claim 3, wherein a fully-connected neural network in the dimensionality reduction layer is configured to perform the dimensionality reduction processing on the difference, and normalize the difference after the dimensionality reduction processing by L2-norm, to obtain the expression embedding result.

5. The method according to claim 1, wherein the sample set comprises a plurality of first sample sets, and each first sample set contains a first anchor sample, a first positive sample, and a first negative sample; and the sample set further comprises second sample sets, and each second sample set contains the first anchor sample and a second positive sample, wherein the second positive sample is a positive sample closest to the first anchor sample in expression among a plurality of first positive samples in the plurality of first sample sets.

6. The method according to claim 5, wherein the second positive sample is the positive sample closest to the first anchor sample obtained by comparing two adjacent first positive samples in sequence among the plurality of first positive samples corresponding to the same first anchor sample.

7. The method according to claim 3, wherein a fully-connected layer is further provided after the dimensionality reduction layer, wherein the fully-connected layer is configured to perform annotation prediction based on the expression embedding result, to obtain annotation prediction results respectively corresponding to a plurality of annotators, wherein the annotation prediction results are used as correction samples to correct the trained facial expression embedding model.

8. The method according to claim 7, wherein each annotator has an individual fully-connected layer to output an individual expression embedding from a common expression embedding, by comparing Euclidean distances of three expression embedding of each data sample images, each fully-connected layer predict an individual label of each annotator.

9. The method according to claim 7, wherein a predicted annotation result is used to correct the trained facial expression embedding model through a gradient descent method by using a loss function corresponding to the predicted annotation result and continuously iterate, until a predicted deviation gradually converges, such that a corrected facial expression embedding model is obtained, wherein the loss function is used to represent a disparity between the predicted annotation result and an actual annotation result of an annotator.

10. A facial expression embedding method, wherein the method comprises steps of:

acquiring a to-be-represented facial image;

processing the facial image by a trained full face embedding model, to obtain a full face feature vector;

processing the facial image by a preset identity embedding model, to obtain an identity feature vector; and subtracting the full face feature vector with the identity feature vector, to obtain an expression feature vector, and obtaining an expression embedding result based on the expression feature vector.

11. The method according to claim 10, wherein the step of obtaining an expression embedding result based on the expression feature vector comprises:

performing dimensionality reduction processing on the expression feature vector, to obtain the expression embedding result.

12. A computer device, comprising a memory and a processor, the memory storing a computer program that can run on the processor, wherein when the processor executes the computer program, steps of a method for training a facial expression embedding model are implemented, wherein the method comprises:

determining a sample set, wherein each sample in the sample set comprises a sample image and a sample tag; and training a to-be-trained facial expression embedding model by using the sample set, to obtain a trained facial expression embedding model, wherein the to-be-trained facial expression embedding model comprises a to-be-trained full face embedding sub-model and a trained identity embedding sub-model, and the trained facial expression embedding model comprises a trained full face embedding sub-model and the trained identity embedding sub-model, and an output of the trained facial expression embedding model is determined by a difference between an output of the trained full face embedding sub-model and an output of the trained identity embedding sub-model.

13. The computer device according to claim 12, wherein the trained identity embedding sub-model and the to-be-trained full face embedding sub-model are the same model.

14. The computer device according to claim 12, wherein the trained facial expression embedding model further contains a dimensionality reduction layer, wherein the dimensionality reduction layer is configured to perform dimensionality reduction processing on the difference, to obtain an expression feature result output by the trained facial expression embedding model.

15. The computer device according to claim 14, wherein a fully-connected neural network in the dimensionality reduction layer is configured to perform the dimensionality reduction processing on the difference, and normalize the difference after the dimensionality reduction processing by 2-norm, to obtain the expression feature result.

16. The computer device according to claim 12, wherein the sample set comprises a plurality of first sample sets, and each first sample set contains a first reference sample, a first positive sample, and a first negative sample; and the sample set further comprises second sample sets, and each second sample set contains the first reference sample and a second positive sample, wherein the second positive sample is a positive sample closest to the first reference sample among a plurality of first positive samples in the plurality of first sample sets.

17. The computer device according to claim 16, wherein the second positive sample is the positive sample closest to the first reference sample obtained by comparing two adjacent first positive samples in sequence among the plurality of first positive samples corresponding to the same first reference sample.

18. A non-transitory computer readable storage medium, wherein a computer executable instruction is stored in the computer readable storage medium, and when the computer executable instruction is invoked and run by a processor, the computer executable instruction causes the processor to run a method for training a facial expression embedding model, wherein the method comprises:

determining a sample set, wherein each sample in the sample set comprises a sample image and a sample tag; and training a to-be-trained facial expression embedding model by using the sample set, to obtain a trained facial expression embedding model, wherein the to-be-trained facial expression embedding model comprises a to-be-trained full face embedding sub-model and a trained identity embedding sub-model, and the trained facial expression embedding model comprises a trained full face embedding sub-model and the trained identity embedding sub-model, and an output of the trained facial expression embedding model is determined by a difference between an output of the trained full face embedding sub-model and an output of the trained identity embedding sub-model.

19. The non-transitory computer readable storage medium according to claim 18, wherein the trained identity embedding sub-model and the to-be-trained full face embedding sub-model are the same model.

20. The non-transitory computer readable storage medium according to claim 18, wherein the trained facial expression embedding model further contains a dimensionality reduction layer, wherein the dimensionality reduction layer is configured to perform dimensionality reduction processing on the difference, to obtain an expression feature result output by the trained facial expression embedding model.

* * * * *